US010248226B2

(12) United States Patent
Gordon et al.

(10) Patent No.: US 10,248,226 B2
(45) Date of Patent: Apr. 2, 2019

(54) CONFIGURING DIGITAL PENS FOR USE ACROSS DIFFERENT APPLICATIONS

(71) Applicant: Microsoft Technology Licensing, LLC, Redmond, WA (US)

(72) Inventors: John C. Gordon, Newcastle, WA (US); Mark R. Rideout, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 15/430,361

(22) Filed: Feb. 10, 2017

(65) Prior Publication Data

US 2018/0232068 A1 Aug. 16, 2018

(51) Int. Cl.
*G06F 3/0354* (2013.01)
*G06F 3/041* (2006.01)
*G06F 3/0484* (2013.01)

(52) U.S. Cl.
CPC ........ *G06F 3/03545* (2013.01); *G06F 3/0416* (2013.01); *G06F 3/04847* (2013.01)

(58) Field of Classification Search
CPC .. G06F 3/03545; G06F 3/0488; G06F 17/242; G06F 2203/04103
See application file for complete search history.

(56) References Cited

U.S. PATENT DOCUMENTS

| 6,690,156 | B1 | 2/2004 | Weiner et al. |
| 7,292,229 | B2 | 11/2007 | Morag et al. |
| 7,372,455 | B2 | 5/2008 | Perski et al. |
| 7,802,202 | B2 | 9/2010 | Fox et al. |

(Continued)

FOREIGN PATENT DOCUMENTS

WO 2015075931 A1 5/2015

OTHER PUBLICATIONS

Weickenmeier, Markus, "Surface Pro 3 Pen—Designed for Accuracy Across the Entire Canvas," available at <<https://blogs.windows.com/devices/2014/05/22/get-know-surface-pro-3-pen/>>, Microsoft Corporation, Redmond, WA, published on May 22, 2014, 8 pages.

(Continued)

*Primary Examiner* — Tom V Sheng
(74) *Attorney, Agent, or Firm* — Rainier Patents, P.S.

(57) ABSTRACT

A technique is described herein for defining at least some characteristics of a digital pen in a global manner across plural applications, such that the pen exhibits the same characteristics across two or more applications. In one implementation, the technique involves: receiving a pen activation signal in response to a user's activation of an input mechanism provided by a particular digital pen; identifying a location on a user interface (UI) presentation that is readily accessible to the user; generating a pen configuration presentation; presenting the pen configuration presentation on the UI presentation at the location that has been identified; receiving a configuration input from the user in response to the user's interaction with the pen configuration presentation; and, in response to the configuration input, storing a global configuration setting that governs a characteristic of ink strokes produced by the particular digital pen across at least two different applications.

22 Claims, 8 Drawing Sheets

(56) References Cited

U.S. PATENT DOCUMENTS

| | | | | |
|---|---|---|---|---|
| 8,638,303 | B2* | 1/2014 | Harris | G06F 1/1616 345/173 |
| 8,963,870 | B2* | 2/2015 | Namkung | G06F 1/1656 345/173 |
| 9,383,839 | B1 | 7/2016 | Rost et al. | |
| 9,639,183 | B2* | 5/2017 | Fleck | G06F 3/03545 |
| 9,760,187 | B2* | 9/2017 | Havilio | G06F 3/03545 |
| 9,851,819 | B2* | 12/2017 | Fleck | G06F 3/03545 |
| 2006/0227116 | A1 | 10/2006 | Zotov et al. | |
| 2009/0021494 | A1 | 1/2009 | Marggraff et al. | |
| 2013/0120463 | A1* | 5/2013 | Harris | G06F 3/04883 345/661 |
| 2014/0047308 | A1* | 2/2014 | Chub | G06F 17/24 715/201 |
| 2014/0198080 | A1* | 7/2014 | Mankowski | G06F 3/03545 345/179 |
| 2014/0210781 | A1 | 7/2014 | Stern | |
| 2014/0210797 | A1 | 7/2014 | Kreek et al. | |
| 2014/0240298 | A1 | 8/2014 | Stern | |
| 2014/0253462 | A1* | 9/2014 | Hicks | G06F 3/03545 345/173 |
| 2014/0253467 | A1 | 9/2014 | Hicks et al. | |
| 2014/0253468 | A1* | 9/2014 | Havilio | G06F 3/03545 345/173 |
| 2014/0253522 | A1* | 9/2014 | Cueto | G06F 3/03545 345/179 |
| 2014/0331147 | A1 | 11/2014 | Jain et al. | |
| 2014/0365978 | A1* | 12/2014 | Fish | G06F 3/017 715/863 |
| 2015/0002481 | A1* | 1/2015 | Mercea | G06F 3/03545 345/179 |
| 2015/0116289 | A1 | 4/2015 | Stern et al. | |
| 2015/0145784 | A1* | 5/2015 | Dowd | G06F 3/04883 345/173 |
| 2015/0193037 | A1* | 7/2015 | Masaki | G06F 3/03545 345/173 |
| 2015/0370772 | A1* | 12/2015 | Wang | G06F 17/241 715/230 |
| 2016/0179365 | A1* | 6/2016 | Angelov | G06F 3/03545 345/179 |
| 2016/0294973 | A1 | 10/2016 | Bakshi et al. | |

OTHER PUBLICATIONS

Huculak, Mauro, "How to customize the active pen settings for Windows Ink on Windows 10 Anniversary Update," available at <<http://www.windowscentral.com/how-customize-active-pen-settings-windows-ink-windows-10-anniversary-update>>, Windows Central, Mobile Nations, published on Jul. 15, 2016, 11 pages.

"Wacom (company)," available at <<https://en.wikipedia.org/wiki/Wacom_(company)>>, Wikipedia article, accessed on Jan. 31, 2017, 4 pages.

"Surface pen," available at <<https://en.wikipedia.org/wiki/Surface_Pen>>, Wikipedia article, accessed on Jan. 31, 2017, 2 pages.

"Company Overview of N-Trig Ltd.," available at <<http://www.bloomberg.com/research/stocks/private/snapshot.asp?privcapId=10320660>>, Bloomberg L.P., accessed on Jan. 31, 2017, 2 pages.

"International Search Report and Written Opinion Issued in PCT Application No. PCT/US2018/016538", dated Apr. 3, 2018, 16 Pages.

* cited by examiner

| PEN ID | SCOPE | PROPERTIES | |
|---|---|---|---|
| B302 | GLOBAL | COLOR = YYY, THICKNESS = X.X, ... | 604 |
| G232 | GLOBAL | COLOR = YYY, THICKNESS = X.X, ... | 606 |
| Z232 | APP-A | COLOR = YYY, THICKNESS = X.X, ... | 608 |
| F143 | APP-A<br>APP-B | COLOR = YYY, THICKNESS = X.X, ...<br>COLOR = YYY, THICKNESS = X.X, ... | 610 |
| G309 | GLOBAL<br>APP-B | COLOR = YYY, THICKNESS = X.X, ...<br>COLOR = YYY, THICKNESS = X.X, ... | 614 |
| J403 | GLOB.V1<br>GLOB.V2 | COLOR = YYY, THICK...<br>COLOR = YYY | 612 |
| ⋮ | ⋮ | | |

ILLUSTRATIVE PEN
CONFIGURATION DATA
602

CONFIGURING DIGITAL PENS FOR USE ACROSS DIFFERENT APPLICATIONS

BACKGROUND

An application may provide a digital inking canvas on which a user may create ink strokes using a digital pen. An application may also provide a native configuration tool that allows the user to define the characteristics (e.g., the color) of the digital pen with respect to that application. The thus-defined characteristics are local with respect to that application, and apply to all pens that the user may use in conjunction with that application. This strategy also means that the same pen can have a first set of characteristics and behaviors relative to a first application and a second set of characteristics and behaviors relative to a second application.

SUMMARY

A technique is described herein for defining at least some characteristics of a digital pen in a global manner across plural applications, such that the pen exhibits the same characteristics across the plural applications.

In one manner of operation, the technique involves: receiving a pen activation signal in response to a user's activation of an input mechanism provided by a particular digital pen; identifying a location on a user interface (UI) presentation that is readily accessible to the user; generating a pen configuration presentation; presenting the pen configuration presentation on the UI presentation at the location that has been identified; receiving a configuration input from the user in response to the user's interaction with the pen configuration presentation; and, in response to the configuration input, storing a global configuration setting that governs a characteristic of ink strokes produced by the particular digital pen across at least two different applications. For instance, the characteristic of the ink strokes may correspond to ink color, baseline thickness, etc.

According to one advantage, the technique's use of a global configuration setting provides good user experience by ensuring that a pen behaves consistently across different applications. The technique's strategic placement of the pen configuration presentation, coupled with the ease at which the pen configuration presentation is activated, also promotes good user experience by facilitating the user's access to the pen configuration presentation.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
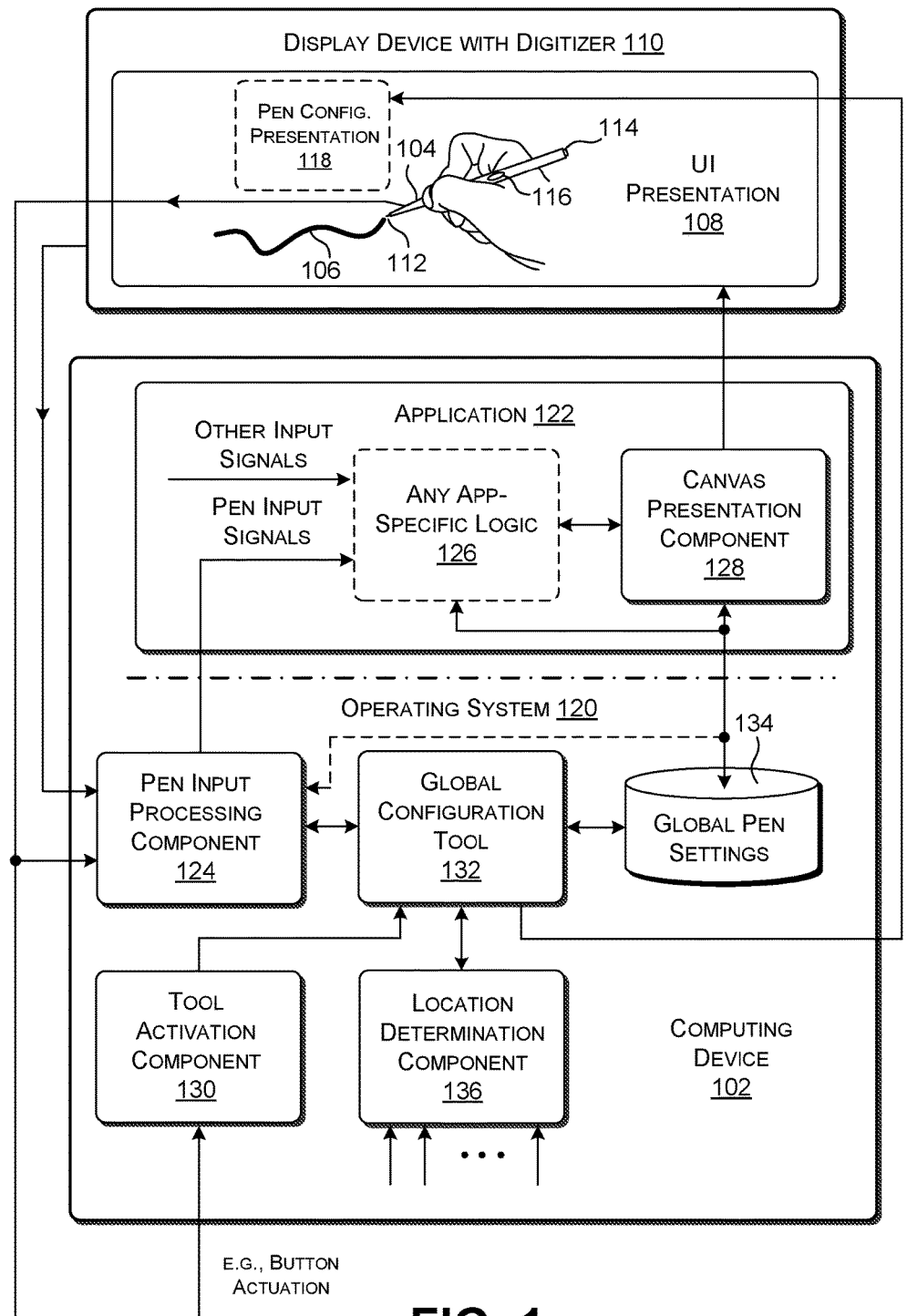
FIG. 1 shows a computing device having functionality for configuring one or more digital pens.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing device having functionality for configuring digital pens. Section B sets forth an illustrative method which explains the operation of the computing device of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, at least some of the blocks shown in the flowcharts can be implemented by software running on computer equipment, or other logic hardware (e.g., FPGAs), etc., or any combination thereof.

As to terminology, the phrase "configured to" encompasses various physical and tangible mechanisms for performing an identified operation. The mechanisms can be configured to perform an operation using, for instance, software running on computer equipment, or other logic hardware (e.g., FPGAs), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, or other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

FIG. 1 shows a computing device 102 having functionality for configuring one or more digital pens. As the term is used herein, a digital pen ("pen" for brevity) refers to any tool by which a user may produce digital ink strokes in the course of interacting with a digital inking canvas, and which provides at least one input mechanism for producing a pen activation signal when activated by the user. A stylus qualifies as a "pen," as that term is used herein, insofar as it can perform the core functions described above.

FIG. 1 shows a high-level representation of one type of pen 104. The user uses the pen 104 to produce ink strokes (such as representative ink stroke 106) on a user interface (UI) presentation 108. The computing device 102 displays the UI presentation 108 on a display device 110. The display device 110, in turn, incorporates a digitizer that detects the movements of the pen 104 over the surface of the display device 110. In another implementation (not shown), the user may interact with a digitizer that corresponds to a separate device (e.g., a graphics tablet) with respect to the display device 110.

Additional details regarding one kind of pen and digitizer are provided below with reference to FIG. 2. By way of preview, the pen 104 in the example of FIG. 1 corresponds to an active-type pen. The pen 104 includes an electronic component that registers the pressure at which the user presses a pen tip 112 against the surface of the display device 110 at each moment of time, to provide pressure information. The pen 104 includes a transmitter that forwards the pressure information to the computing device 102.

The pen 104 also includes one or more input mechanisms (e.g., buttons) that the user may activate to produce activation signals. For instance, without limitation, the particular pen 104 shown in FIG. 1 includes a first input mechanism 114 accessible at the distal end of the pen 104. The pen 104 includes at least one additional input mechanism 116 on the elongate shaft of the pen 104. The pen's transmitter forwards an activation signal to the computing device 102 when the user activates one of the pen's input mechanisms (114, 116).

In one implementation, the computing device 102 responds to one of the activation signals by generating a pen configuration presentation 118. The pen configuration presentation 118 corresponds to a graphical control element through which the user may enter configuration inputs. In response to these inputs, the computing device 102 stores a configuration setting that governs the appearance and/or behavior of inks stroke produced by the pen 104. For instance, the configuration setting may define the color and/or baseline thickness of ink strokes produced by the pen 104.

The thus-defined configuration setting is global because it applies across at least two applications that execute on the computing device 102. For instance, the configuration setting may apply to all applications that execute on the computing device 102. Or the configuration setting may apply to only a specified class of applications that execute on the computing device 102.

In any event, the common configuration setting of the pen 104 allows it to have consistent characteristics and behavior across the applications to which it applies. For instance, the user may define the color of the pen 104 as red. Henceforth, the pen 104 will produce red-colored ink strokes when applied to any application in which the pen is used. The user may define other pens to have different characteristics across applications, e.g., by configuring another pen as a green-colored pen and another pen as a black-colored pen, etc. This behavior contributes to good user experience because the user can treat the pen 104 as a physical implement having fixed properties (while keeping in mind that the user may also reconfigure the pen 104 at any time); this feature, in turn, makes it easier for a user to remember the characteristics associated with the pen 104, with respect to other pens that have other characteristics.

The computing device 102 presents the pen configuration presentation 118 at a location on the UI presentation 108 that is presumed to be readily accessible to the user. As will be described below, the computing device 102 can identity a readily-accessible location based on one or more accessibility factors. Each accessibility factor provides evidence as to where to place the pen configuration presentation 118 so as to facilitate its access by the user.

More specifically, the computing device 102 facilitates the user's access to the pen configuration presentation 118 in at least two ways. First, the user may easily activate the pen configuration presentation 118 by pressing a pen-side input mechanism. Further, that activation mechanism remains the same across different applications. This aspect eliminates the need for the user to search for an application-specific control that will activate the pen configuration presentation 118. Second, the user may easily access the pen configuration presentation 118 once it is activated, by virtue of its strategic placement on the UI presentation 108. This behavior leads to less disruption of the user's drawing task, e.g., by not forcing the user to reach for an inconveniently-placed control feature on the UI presentation 108.

Moreover, the configuration strategy described above is beneficial to application developers. The application developers are freed from the responsibility of developing native pen configuration tools. Further, the application developers may provide less cluttered user interface presentations by eliminating the space that would otherwise be required to convey to the user how to access their native configuration tools.

The computing device 102 can correspond to any apparatus for processing machine-readable instructions, and can have any form factor. For instance, the computing device 102 can correspond to a stationary personal computing device, a laptop computing device, a handheld computing device of any type (e.g., a smartphone, a tablet-type computing device, etc.), a wearable computing device, a game console, a set-top box, etc. In some implementations, the display device 110 is an integral component of the computing device 102. In other implementations, the display device 110 represents a separate component with respect to the computing device 102 that is communicatively coupled to the computing device 102.

The computing device 102 has an operating system 120 and provides at least one application 122. The operating system 120 provides functionality that allows the application 122 to interact with its hardware-level resources (e.g., its storage and processing resources). The operating system 120 also provides functionality that allows the application 122 to interact with input/output devices coupled thereto.

The application 122 can perform any function. For instance, in one merely representative case, the application 122 may perform a note-taking function as a primary task or a subsidiary task. The logic associated with the application 122 can be stored at various locations. For instance, the logic can be wholly stored by the computing device 102 itself. In other cases, the logic can be distributed between one or more remote servers and the local computing device 102. In other cases, the logic can be wholly implemented by one or more remote servers; in that case, the computing device 102 can access the application 122 via a browser component.

The computing device 102 can interact with the pen 104 in at least two contexts. In a first context, the application 122 provides a digital inking canvas on the UI presentation 108 in the course of performing its application-specific functions. For example, a healthcare-related application 122 can provide a digital inking canvas that provides a space within which a healthcare profession may create and edit handwritten notes. In a second context, some component of the operating system 120 may provide the digital inking canvas as a base utility. A user may interact with that base utility in independent fashion regardless of whether the application 122 is running or not. FIG. 1 illustrates the first kind of use scenario; but all the principles described herein apply with equal force to the second use scenario.

The digital inking canvas generally denotes a region of the UI presentation 108 that is configured to interact with the user via the pen 104. In some cases, the digital inking canvas has the same spatial extent as the UI presentation 108 itself. In other cases, the digital inking canvas occupies a portion of the screen space associated with the UI presentation 108.

The operating system 120 includes a collection of processing resources that perform the task of processing input information from the pen 104 and for configuring the pen 104. For instance, a pen input processing component 124 receives position information from the digitizer that reflects the current location of the pen tip 112 within the x-y plane defined by the digital inking canvas. The position information may also optionally indicate whether the pen tip 112 is currently in contact with the surface of the digital inking canvas or not. In some implementations, the pen input processing component 124 also optionally receives pressure information from the pen 104 itself. Finally, the pen input processing component 124 can receive a pen identifier that identifies the particular pen 104 that is supplying the position information and the pressure information.

The pen input processing component 124 formulates pen input signals that encapsulate the position information and the pressure information. The pen input processing component 124 can also tag (or otherwise associate) the pen input signals with the pen identifier of the pen 104 that has produced the position information and pressure information. The pen input processing component 124 can then forward the pen input signals to any consumer(s) of that information, e.g., corresponding to the application 122 and/or another operating system component.

In the example of FIG. 1, the application 122 includes application-specific logic 126 for processing the pen input signals, to provide ink strokes. A canvas presentation component 128 can provide the digital inking canvas on the UI presentation 108, and then display the ink strokes on the digital inking canvas. More specifically, the application-specific logic 126 and/or the canvas presentation component 128 can leverage the location information to determine where to place an ink stroke on the digital inking canvas. The application-specific logic 126 and/or the canvas presentation component 128 can leverage the pressure information to determine the thickness of the ink stroke. That is, the application-specific logic 126 and/or the canvas presentation component 128 will typically compute the thickness of the ink stroke as some positive function of a pressure value, such that thickness increases with increasing pressure values.

Although not shown, the pen input processing component 124 can alternatively forward the pen input signals to some component implemented by the operating system 120, rather than, or in addition to, the application 122. That operating system component can then perform the same tasks as the application 122, e.g., by providing a digital inking canvas and presenting ink strokes on that digital inking canvas.

A tool activation component 130 receives a pen activation signal in response to the user's activation of one of the input mechanisms provided by the pen 104, e.g., corresponding the user's activation of the input mechanism 114 or the input mechanism 116. In some cases, the user may activate an input mechanism of the pen 104 in the course of interacting with the application 122. In other cases, the user may activate an input mechanism outside the context of the user's interaction with any application 122; for instance, the user may activate an input mechanism when no user applications are currently being executed by the computing device 102.

A global configuration tool 132 receives the pen activation signal from the tool activation component 130. In response, the global configuration tool 132 presents the pen configuration presentation 118 on the UI presentation 108. The global configuration tool 132 then receives at least one configuration input as a result of the user's interaction with the pen configuration presentation 118. For instance, the global configuration tool 132 receives at least one configuration input in response to the user selecting a configuration option on the pen configuration presentation 118. The user may select that configuration option using the pen 104 and/or some other input mechanism (e.g., using a mouse device, a finger touch on a touch-sensitive screen, etc.). In response to the configuration input(s), the global configuration tool 132 stores a configuration setting in a data store 134. As noted above, the configuration setting governs some aspect of the appearance and/or behavior of the pen's ink strokes, such as the color of the ink strokes, the baseline thickness of the ink strokes, the transparency level of the ink strokes, etc.

FIG. 1 indicates that the global configuration tool 132 stores the configuration setting in a local data store 134 provided by the computing device 102 itself. Alternatively, or in addition, the global configuration tool 132 can store the configuration setting in a data store provided by the pen 104 itself; in this case, the global configuration tool 132 can forward the configuration setting to the pen 104 via wireless communication. Alternatively, or in addition, the global configuration tool 132 can store the configuration setting in a remote data store provided by a remote resource, e.g., corresponding to a remote data store provided by a remote server. For instance, the global configuration tool 132 can optionally store the configuration setting in a user profile associated with the user.

The application's application-specific logic 126 and/or canvas presentation component 128 consults the thus-defined global setting when drawing ink strokes on a digital inking canvas. For instance, the application-specific logic 126 and/or canvas presentation component 128 receives information from the pen 104 (via the pen input processing component 124) that conveys a pen identifier associated with the pen, e.g., corresponding to a unique code associated with the pen. The application-specific logic 126 and/or canvas presentation component 128 then uses the pen identifier as a lookup key to retrieve the configuration setting associated with the pen 104. The application-specific logic 126 and/or the canvas presentation component 128 uses the configuration setting to govern some aspect of the visual appearance and/or behavior of ink strokes drawn on the digital inking canvas, such as the color and/or baseline thickness of the ink strokes.

Generally, note that the data store 134 that stores the configuration setting for the pen 104 is not a resource exclusively associated with the application 122. Hence, another application can apply the same configuration setting when drawing ink strokes in the manner described above. The consequence of this architecture is as stated above: the pen 104 will exhibit the same characteristics and behaviors across different applications, thereby promoting good user experience.

Further note that the computing device 104 can leverage a configuration setting in alternative ways compared to the illustrative manner specified above. For instance, in another implementation, the pen input processing component 124 can retrieve the configuration setting from the data store 134 and add this information to the pen input signals that it forwards to the application 122. This manner of operation would eliminate the need for the application-specific logic 126 and/or the canvas presentation component 128 to perform the above-described lookup operation (because it is performed at an earlier stage in the flow by the pen input processing component 124).

A location determination component 136 identifies a location at which to place the pen configuration presentation 118 based on one or more accessibility factors. One accessibility factor describes a last (most recent) location at which the user has applied an ink stroke on the UI presentation 108. The digitizer provides position information that reveals that last location.

Another accessibility factor describes a current location of the hand of the user and/or the pen 104. In one implementation, the digitizer can provide position information that reveals the position of the user's hand and/or the pen 104, even when the hand and/or the pen 104 are not in contact with the surface of the display device 110. For instance, the digitizer can use a capacitance technique to sense the location of the user's hand and/or the pen 104. Alternatively, or in addition, one or more cameras can detect the position of the user's hand and/or the pen 104. The camera(s) can optionally include a depth camera system that uses a time-of-flight technique, a structured light technique, a stereoscopic technique, etc. to capture a depth image of user's hand and/or the pen 104. Alternatively, or in addition, an inertial measurement unit (IMU) associated with the pen 104 can detect the position of the pen 104, and, by extension, the position of the hand that holds the pen 104. The IMU can include any combination of one or more accelerometers, gyroscopes, magnetometers, etc. Still other techniques for detecting the location of the user's hand and/or the pen 104 can be used.

Another accessibility factor describes a representative location defined with respect to plural ink strokes produced by the user on the UI presentation 108 within a recent span of time that culminates in a current time. For instance, the location determination component 136 can form a set defined by all of the ink strokes created by the user within the last minute. The location determination component 136 can then identify a representative location as the center of mass of those ink strokes. The location determination component 136 can also optionally weight each ink stroke using a decay function, with respect to the time at which it was created; this decay function will have the effect of diminishing the contribution of older ink strokes relative to newer ink strokes.

Another accessibility factor describes the preferences of an individual user. The user may provide preference information that explicitly identifies his or her preference as to where the user prefers to interact with the pen configuration presentation 118. Alternatively, or in addition, the location determination component 136 can infer the preference information based on the prior actions taken by the user. For instance, assume that the user repeatedly moves the pen configuration presentation 118 from its initial position to the lower right-hand corner of the UI presentation 108. Upon detecting such a behavioral pattern with a prescribed degree of confidence, the location determination component 136 can automatically select that location as the preferred location at which to present the pen configuration presentation 118.

The location determination component 136 can select a location based on any subset of the above-described accessibility factors, using any selection logic. For instance, the location determination component 136 can select a location based on one or more IF-THEN rules. For example, a first rule may indicate that: IF the user has produced an ink stroke on the digital inking canvas within the last 5 seconds, THEN the global configuration tool 132 should display the pen configuration presentation 118 immediately above (e.g., 1 cm above) the most recent inking location. A second IF-THEN rule may indicate that: IF the first-mentioned rule does not apply, THEN the global configuration tool 132 should display the pen configuration presentation as close as possible to the current position of the user's hand and/or the pen 104. Alternatively, the location determination component 136 can individually apply each accessibility factor to select a candidate location, to overall provide a set of candidate locations. The location determination component 136 can then select a final location that is equidistant from the candidate locations in the set.

Figure 2:
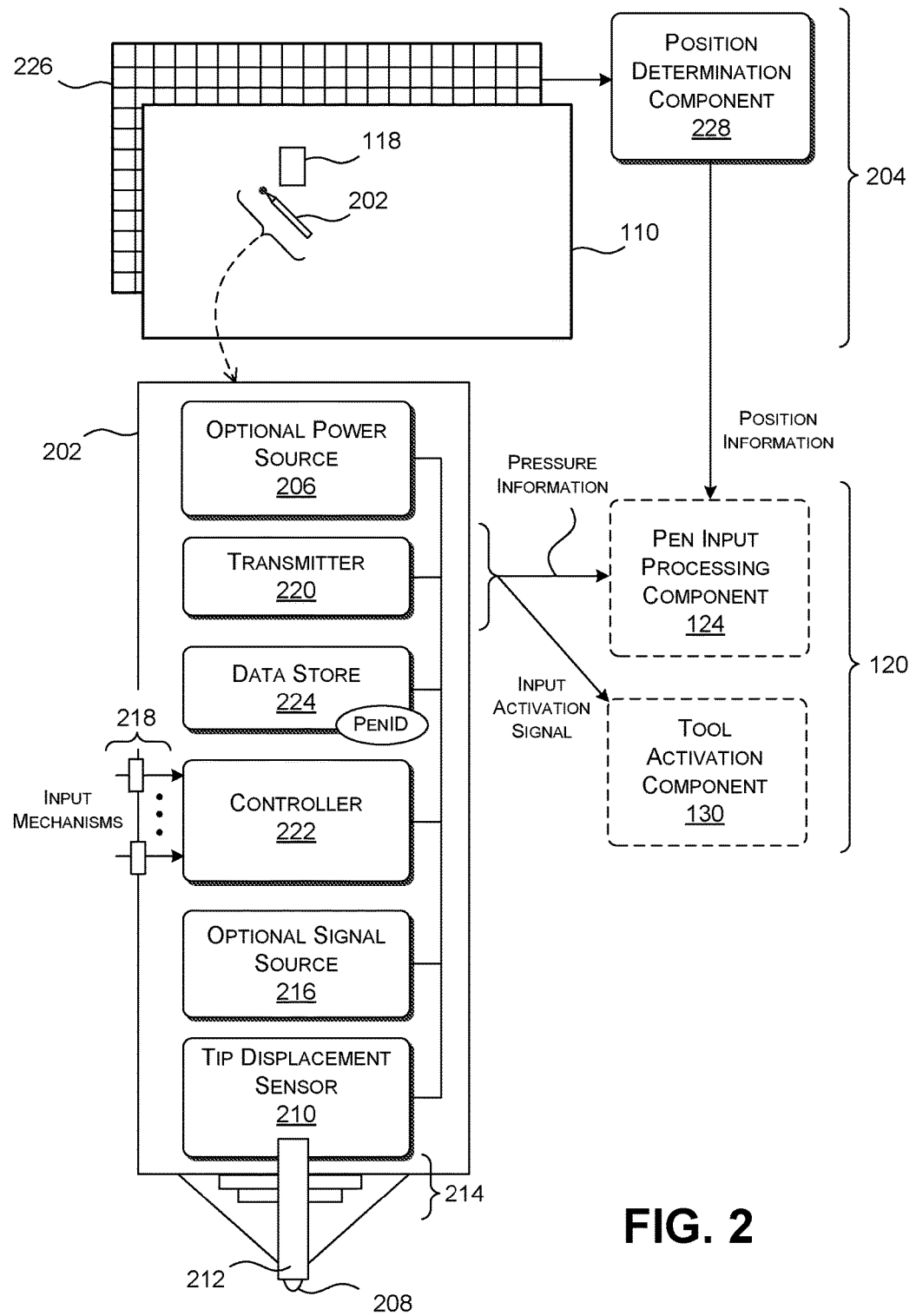
FIG. 2 shows one implementation of a digital pen in conjunction with a digitizer, for use in the computing device of FIG. 1.

FIG. 2 shows one implementation of a digital pen 202 in conjunction with a digitizer 204, for use in the computing device 102 of FIG. 1. The particular pen 202 shown in FIG. 2 includes a housing that includes various electronic components. A power source 206 applies power to the electronic components. Alternatively, the pen 202 includes no independent power source. In that case, the pen 202 is powered via electromagnetic energy that it receives in the course of its interaction with the digitizer 204.

The pen 202 includes a pen tip 208. In some cases, the user produces an ink stroke by placing the pen tip 208 in contact with a surface of the digitizer 204 and moving the pen 202 across the surface of the digitizer 204. The user may also interact with the digitizer 204 by placing the pen tip 208 in proximity to the surface of the digitizer 204, but not in actual physical contact with the surface.

An optional tip displacement sensor 210 registers the force with which the user applies the pen 202 against the surface of the digitizer 204. In one merely illustrative implementation, the pen tip 208 is coupled to a shaft member 212. The displacement sensor 210 includes an optical encoder that registers the vertical displacement of the shaft member 212. A resilient/elastic member 214 (such as a spring) exerts downward-directed force on the pen tip 208 along the longitudinal axis of the pen 202.

In some implementations, an optional signal source 216 generates an electromagnetic signal. The pen 202 directs the electromagnetic signal to the surface of the digitizer 204 when the pen 202 is placed in contact (or in close proximity but not touching contact) with the surface. In some implementations, the digitizer 204 detects the position of the pen tip 208 based on the electromagnetic signal emitted by the pen 202.

One or more input mechanisms 218 provide input activation signals when activated by the user. For example, the input mechanisms 218 can correspond to buttons of any type on the housing of the pen 202. In the example of FIG. 1, the pen 104 includes two button-type input mechanisms (114, 116). Other input mechanisms can include slider mechanisms, toggle switches, etc. Further, a single button may be used to conjunction with plural input mechanisms. For example, the user may click a single button once to activate a first input state, twice to activate a second input state, and thrice to activate a third input state; a subsequent click may return the pen 202 to the first state.

A transmitter 220 can forward various information collected by the pen 202 to the digitizer 204. For example, the transmitter 220 can send pressure information that reflects the current pressure that the user is applying to the pen 202 against the surface of the digitizer 204. In addition, the transmitter 220 can send an input activation signal when the user activates one of the input mechanisms 218. The transmitter 220 can use any wireless and/or hardwired communication path to send such information. For example, the transmitter 220 can send wireless signals using the BLUETOOTH protocol.

A controller 222 governs the operation of the above-described components and data-collection processes. The controller 222 may correspond to an Application Specific Integrated Circuit (ASIC) that includes custom logic. Alternatively, or in addition, the controller 222 can include one or more general-purpose processing units.

A data store 224 stores various information collected by the pen prior to transfer to the computing device 102. The data store 224 can also store a pen identifier. A manufacturer and/or an end user can specify the pen identifier.

More generally, the computing device 102 of FIG. 1 can be used in conjunction with any type of pen. For instance, the computing device 102 can work in conjunction with any active pen produced by N-Trig Ltd., of Tel-Aviv, Israel, or Wacom Co., Ltd., of Kazo, Saitama, Japan, or Microsoft Corporation of Redmond, Wash. Background information on technology that can be used to implement a pen can also be found, for instance, in: U.S. Published Application No. 20150116289 to Stern, et al., entitled "PRESSURE SENSITIVE STYLUS FOR A DIGITIZER," published on Apr. 30, 2015; U.S. Published Application No. 20140240298 to Yuval Stern, entitled "STYLUS FOR A DIGITIZER SYSTEM," published on Aug. 28, 2014, and so on.

Now referring to the digitizer, the digitizer 204 can include a sensor 226 that registers the (x, y) location of the pen 202 with respect to a plane defined by the surface of the digitizer 204. The sensor 226 can be implemented in different ways. Without limitation, in one technique, the sensor 226 includes an array of horizontal and vertical conductive strips. A position determination component 228 receives signals from the strips, and estimates the location of the pen tip 208 based on those signals. For instance, the sensor 226 can detect signals emitted by the signal source 216. Alternatively, or in addition, the sensor 226 can emit independent electromagnetic signals, and register the pen's reaction to the electromagnetic signals, e.g., through the process of electromagnetic induction.

Other implementations of the digitizer 204 can use an optical technique or an acoustic technique, or any combination thereof, to determine the location of the pen 202 on the surface of the digitizer 204. An optical technique uses one or more cameras to detect the location of the pen 202. An acoustic technique uses one or more microphones to detect acoustic signals emitted by the pen 202

In some implementations, the sensor 226 is integrated with the display device 110 on which the computing device 102 presents the UI presentation 108. For example, the sensor 226 may correspond to a transparent layer of a Liquid Crystal Display (LCD) device. In other cases the sensor 226 corresponds to a separate component relative to the display device 110.

More generally, the computing device 102 of FIG. 1 can be used in conjunction with any type of digitizer that uses any data collection strategy. For instance, the computing device 102 can work in conjunction with any digitizer produced by N-Trig Ltd. or Wacom Co., Ltd. or Microsoft Corporation. Background information regarding technology that can be used to implement a digitizer can also be found, for instance, in: U.S. Published Application No. 20140210781 to Yuval Stern, entitled "DIGITIZER SYSTEM," having an issue date of Jul. 31, 2014; U.S. Pat. No. 7,372,455 to Perski, et al., entitled "TOUCH DETECTION FOR A DIGITIZER," having at issue date of May 13, 2008; U.S. Pat. No. 7,292,229 to Morag, et al., entitled "TRANSPARENT DIGITIZER," having an issue date of Nov. 6, 2007; U.S. Pat. No. 6,690,156 to Weiner et al., entitled "PHYSICAL OBJECT LOCATION APPARATUS AND METHOD AND A GRAPHIC DISPLAY DEVICE USING THE SAME," having an issue date of Feb. 10, 2004, and so on.

As explained above in connection with FIG. 1, a pen input processing component 124 can receive pressure information from the pen 202 and location information from the digitizer 204. The tool activation component 130 receives an input activation signal from the pen 202 when the user activates one of the input mechanisms 218.

Figure 3:
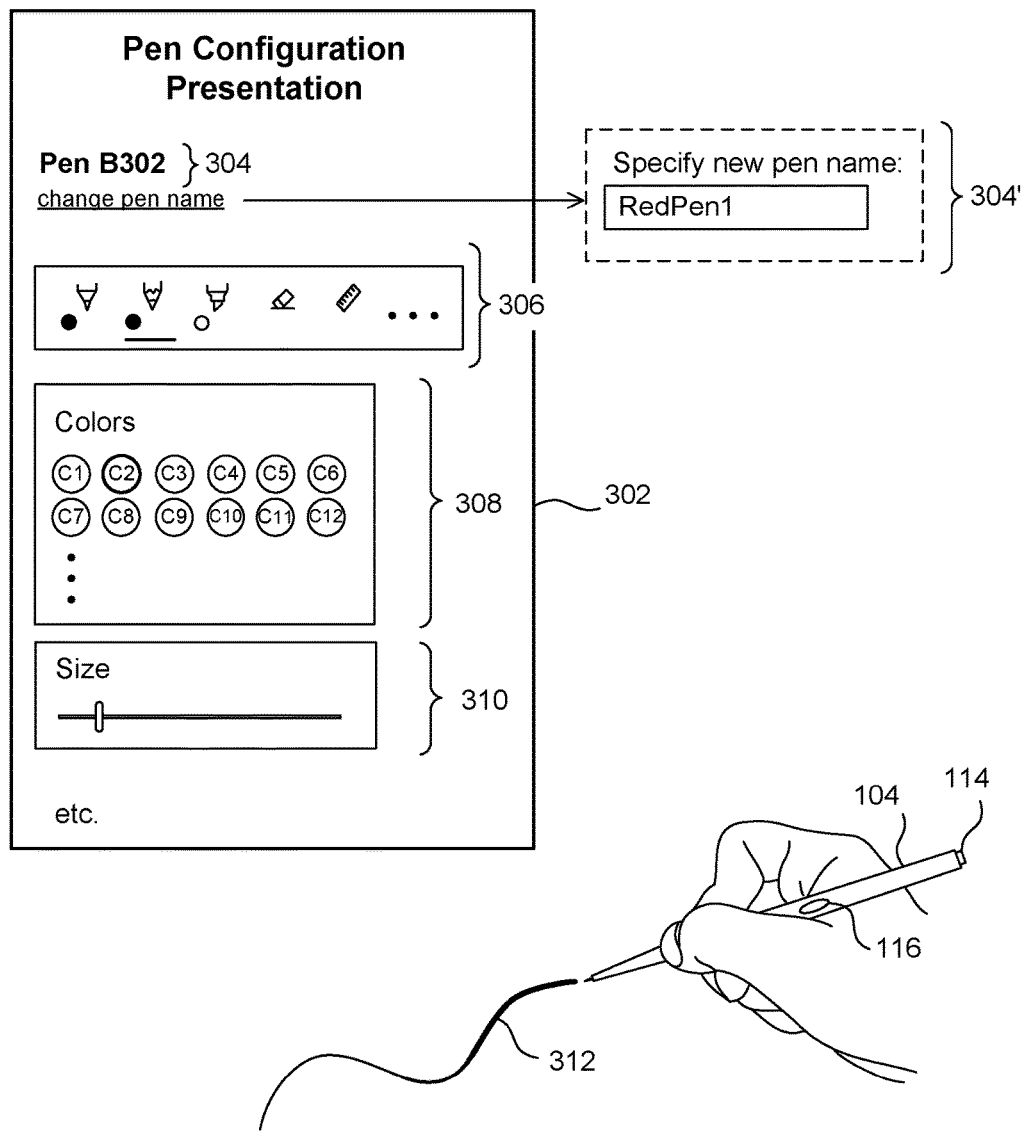
FIG. 3 shows one implementation of a pen configuration presentation that can be provided by the computing device of FIG. 1.

FIG. 3 shows one implementation of a pen configuration presentation 302 that can be provided by the computing device 102 of FIG. 1. In other words, the global configuration tool 132 presents the pen configuration presentation 302 in response to an input activation signal received from the pen 104. The pen 104 sends the input activation signal, in turn, when the user activates one of the pen's input mechanisms. The user may interact with the pen configuration presentation 302 using any input devices, such as the pen 104 itself.

The pen configuration presentation 302 can assume different forms in different implementations. In one merely illustrative implementation, the pen configuration presentation 302 includes an information item 304 that identifies the pen 104 that is being configured. For instance, the information item 304 can display a code and/or name associated with the pen 104, as assigned by the manufacturer. The pen 104 may communicate this information to the computing device 102, e.g., via wireless communication.

In some implementations, a pen may not have a native pen identifier that is supplied by the manufacturer of the pen. Or the user may wish to change the native pen identifier. In these circumstances, the pen configuration presentation 302 can include a control element 304' that allows the user to choose the pen identifier, e.g., by providing an arbitrary name or code associated with the pen, such as "Pen1," or "RedPen1," etc. The computing device 102 can optionally thereafter transfer the new pen identifier to the pen 104 for storage in its data store 224.

The pen configuration presentation 302 can also include a control feature 306 that allows the user to define the general type of the pen 104. For instance, the control feature 306 can allow the user to specify whether the pen 104 corresponds to an ink-type pen, a pencil, a highlighter marker, etc. In some implementations, the application-specific logic 126 and/or the canvas presentation component 128 modifies the appearance and/or behavior of ink strokes in a manner that depends on the pen's basic type, as defined via the control feature 306. For example, the application-specific logic 126 and/or the canvas-presentation component 128 can produce ink strokes that resemble graphite markings when the user chooses a pencil type, and produce ink strokes that resemble liquid ink markings when the user chooses an ink pen type.

A control feature 308 corresponds to a color picker that allows the user to choose the color of ink strokes produced by the pen 104. The application-specific logic 126 and/or the canvas presentation component 128 display ink strokes in the color that has been selected for that pen 104.

A control feature 310 allows the user to choose the baseline thickness of the ink strokes produced by the pen 104. The application-specific logic 126 and/or the canvas presentation component 128 can thereafter vary the thickness of the ink strokes as a joint function of the baseline thickness and the pressure information. FIG. 3 shows an example in which the user applies increasing pressure as he or she draws the pen 104 across the UI presentation 108; the application-specific logic 126 and/or the canvas presentation component 128 increases the thickness as a function of the increasing pressure.

Other implementations can allow the user to choose other characteristics that govern the appearance and/or behavior of ink strokes produced by the pen 104. For instance, other implementations can allow the user to choose any one or more of: a transparency level associated with the ink strokes; any other special effect(s) associated with the ink strokes (e.g., glow effect, etc.); an ink type associated with the pen 104 (e.g., corresponding to oil paint, watercolor paint, etc.); the pressure sensitivity characteristics of the pen 104, and so on.

In some development environments, different developers can provide different global configuration tools having different respective features and levels of complexity. And end user can purchase or otherwise acquire a desired global configuration tool and load that tool into the computing device 102. Or the user may choose among plural available global configuration tools at runtime. Or a developer can provide a global configuration tool that acts as a "plug in" that supplements an existing global development tool. More generally, this strategy helps partition the division of labor associated with application development. A first class of developers can provide application-agnostic pen configuration tools, while a second class of developers can develop applications that have no native configuration functionality, but may nevertheless leverage the application-agnostic pen configuration tools.

In any event, the computing device 104 provides good user experience because it provides a consistent configuration experience across different applications. Further, a user can enable/disable configuration options so that the pen configuration presentation 302 delivers a desired focus of utility to the user, which, in turn, depends on the preferences of the user and the kinds of applications with which the user commonly interacts. For instance, each user can choose a subset of configuration options from a larger universe of configuration options; the pen configuration presentation 302 will henceforth show only that subset of configuration options that the user has selected.

Although not shown in FIG. 1, in some implementations, the pen 104 itself can include a display element (e.g., an LCD element) that displays identifying information, such as its pen identifier (e.g., its name). The display element can also display any part of the configuration setting produced by the pen configuration presentation 302. For example, the display element can display the word "red" for a red-colored pen, or can display a red-color indicator, such as a red-colored dot.

Figure 4:
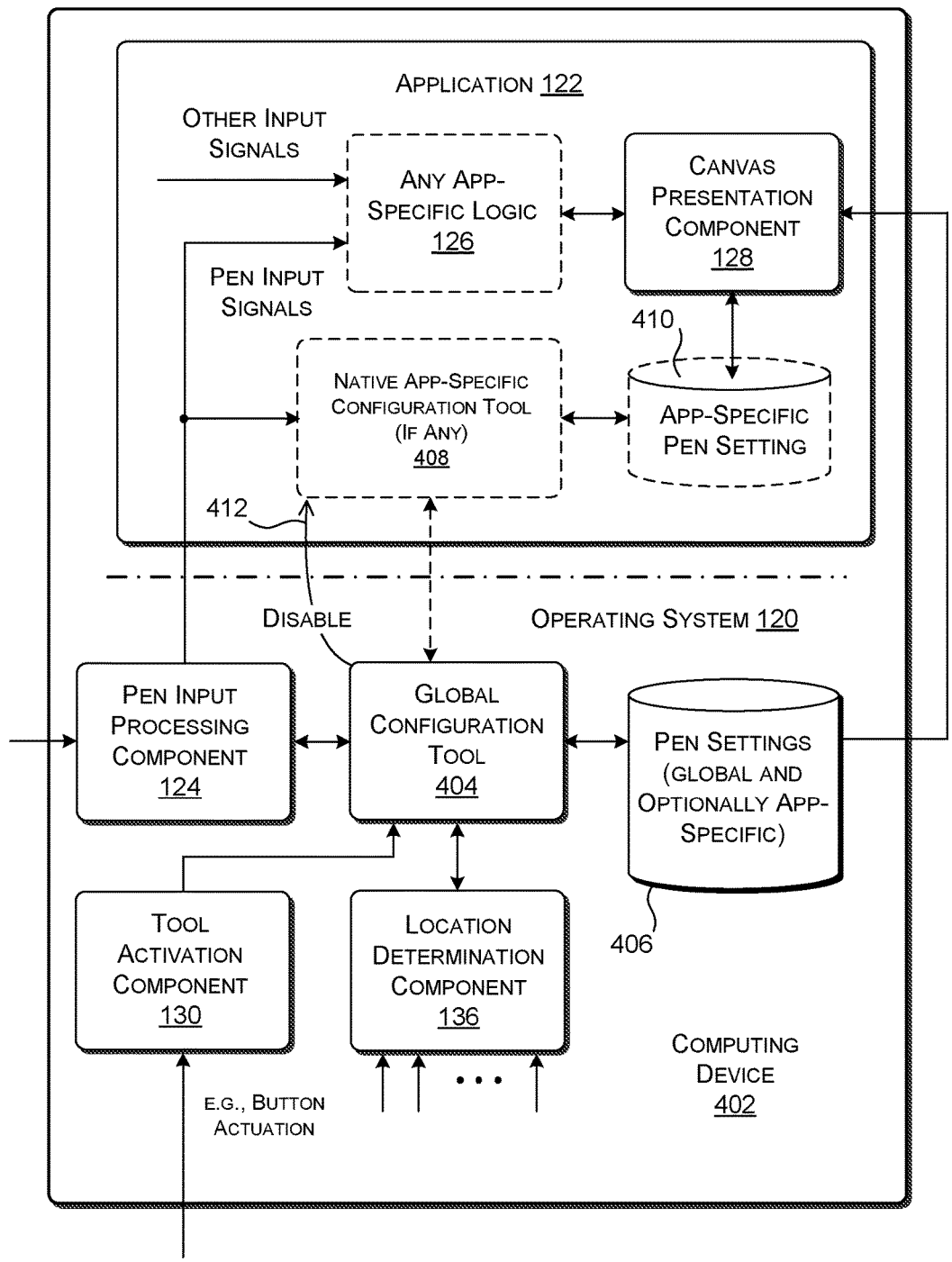
FIG. 4 shows another implementation of a computing device having functionality for configuring one or more digital pens.

FIG. 4 shows another implementation of a computing device 402 having functionality for configuring one or more digital pens. The components in FIG. 4 having series-100 reference numerals perform the same functions described above, with respect to same-labeled components of FIG. 1.

The computing device 402 of FIG. 4 has a global configuration tool 404 that generates global configuration settings, as in the case of FIG. 4. In addition, the global configuration tool 404 allows the user to optionally specify application-specific settings. For example, the global configuration tool 404 can provide the pen configuration presentation 502 shown in FIG. 5. In addition to the information items and control features shown in FIG. 3, the pen configuration presentation 502 includes a control feature 504 that invites the user to indicate whether the to-be-defined configuration setting will subsequently apply to all applications (in the case of a global configuration setting) or just a specific application (in the case of an application-specific configuration setting). The global configuration tool 404 stores its configuration settings in a data store 406.

In one case, the application to which an application-specific configuration setting applies is determined by the context in which the user activates the pen configuration presentation 502. For example, if the user activates the pen configuration presentation 502 in the course of interacting with an application A, then the application-specific configuration setting (if chosen) is applied to application A. Similarly, if the user activates the pen configuration presentation 502 in the course of interacting with an application B, then the application-specific configuration setting (if chosen) is applied to application B.

The application-specific logic 126 and/or the canvas presentation component 128 can respond to the configuration settings in the data store 406 based on one or more application-specific rules. Assume that the application-specific logic 126 and/or the canvas presentation component 128 seeks to present ink strokes in the context of a digital inking canvas produced by the application 122. According to one rule, the application-specific logic 126 and/or the canvas presentation component 128 can choose an application-specific configuration setting for the application 122 if it exists; otherwise, the application-specific logic 126 and/or the canvas presentation component 128 will choose a global configuration setting. Alternatively, the application-specific logic 126 and/or the canvas presentation component 128 can solicit an input selection from the user, whereby the user chooses between the application-specific configuration setting and the global configuration setting.

In another implementation, the global configuration tool 404 can invite the user to define an application-specific configuration setting for a class of applications, rather than a specific application.

In another implementation, the global configuration tool 404 can invite the user to define two or more alternative global configuration settings. At runtime, the application-specific logic 126 and/or the canvas presentation component 128 can invite the user to choose from among the available global configuration settings. In a similar manner, the global configuration tool 404 can invite the user to define two or more application-specific configuration settings for any particular application. At runtime, the application-specific logic 126 and/or the canvas presentation component 128 can invite the user to choose from among the available application-specific configuration settings.

In one approach, the computing device 102 can assign different input mechanisms on the pen 104 to different configuration settings. The input mechanisms constitute configuration-selection input mechanisms. At runtime, the user can select from among the plural configuration settings by activating an appropriate configuration-selection input mechanism associated with that chosen configuration setting. For example, the user may interact with the global configuration tool 404 to create a first global configuration setting in which the pen's ink is presented in the color blue, and a second global configuration setting in which the pen's ink is presented in the color black. At runtime, the user can choose a first button to invoke the blue color configuration setting or a second button to invoke the black color configuration setting. This approach can be extended with respect to any number of selectable configuration options. In some implementation, these configuration-selection input mechanisms can be different from the above-described input mechanism that activates the pen configuration presentation 118. Or any configuration-selection input mechanism can also activate the pen configuration presentation 118; in other words, such a configuration-selection input mechanism can load an existing configuration setting, and also give the user the opportunity to change that existing configuration setting via the pen configuration present 118.

Alternatively, or in addition, the computing device 102 can assign different input mechanisms on the pen 104 to different configuration modes. At runtime, the user can select from among the plural configuration modes by activating an appropriate input mechanism associated with the chosen configuration mode. For example, the user may choose a first input mechanism to instruct the global configuration tool 404 to invoke a pen configuration presentation that is dedicated to creating a global configuration setting. The user may choose a second input mechanism to instruct the global configuration tool 404 to invoke a pen configuration presentation that is dedicated to creating an application-specific configuration setting.

In another example, the user may choose a first input mechanism to instruct the global configuration tool 404 to invoke a pen configuration presentation that is dedicated to defining a first subset of configuration choices, such as color-related configuration choices. The user may choose a second input mechanism to instruct the global configuration tool 404 to invoke a pen configuration presentation that is dedicated to defining a second subset of configuration choices, such as ink-behavior-related configuration choices.

Figures 5, 6:
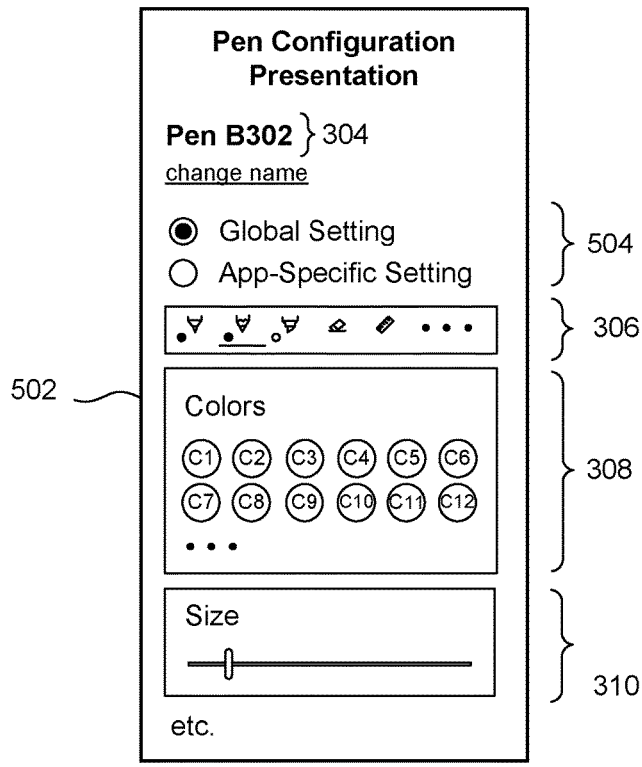
FIG. 5 shows a pen configuration presentation that can be provided by the computing device of FIG. 4.
FIG. 6 shows configuration data that can be generated by the computing device of FIG. 4.

FIG. 6 shows a sample of configuration data 602 stored in the data store 406. A first field of the configuration data 602 identifies each pen, e.g., using a code or user-defined name associated with each pen. A second field of the configuration data specifies the scope of a pen's configuration setting. As described above, the scope of a pen's configuration setting can assume at least the following states: (a) a single global configuration setting (as in examples 604 and 606); or (b) a single application-specific setting for a particular application (as in example 608); or (c) two or more application-specific settings associated with two or more respective particular applications (as in example 610); or (d) two or more alternative global configuration settings that are selectable at runtime (as in example 612); or (e) two or more alternative application-specific settings for a particular application that are selectable at runtime, etc., or any combination thereof (as in example 614).

FIG. 6 also shows the configuration data that can be stored by the computing device 102 in the data store 134 (of FIG. 1), with limited respect to the first two entries in the configuration data 602.

As a final topic, any application that was developed prior to the introduction of the global configuration tool 404 may be referred to as a legacy application. A legacy application can have its own native application-specific configuration tool 408 for generating a native application-specific configuration setting. The application-specific configuration tool 408 can store the application-specific configuration setting in a data store 410 associated with the application 122. The application-specific logic 126 and/or the canvas presentation component 128 use the application-specific configuration setting when drawing ink strokes on the digital inking canvas. The computing device 402 can handle the inclusion of the native application-specific configuration tool 408 in different environment-specific ways. Illustrative techniques are set forth as follows.

In a first approach, the application 122 takes no account for the inclusion of the global configuration tool 404. Here, the application-specific logic 126 and/or the canvas presentation component 128 will continue to display ink strokes based on the application-specific configuration setting in the data store 410.

In a second approach, the application 122 is designed in such a manner that the application-specific configuration tool 408 can be disabled, e.g., by making an application setting that achieves this effect. In this case, the global configuration tool 404 can send a signal 412 to the application-specific configuration tool 408, which causes it to be disabled. The application-specific logic 126 and/or the canvas presentation component 128 can be configured such that it reads from the new data store 406, e.g., by replacing the old data store 410 with the new data store 406, or by redirecting a call to the old data store 410 to the new data store 406

In a third approach, the application 122 accommodates both the application-specific configuration tool 408 and the global configuration tool 404. The end user will use the global configuration tool 404 instead of the application-specific configuration tool 408. The application-specific logic 126 and/or the canvas presentation component 128 can be configured such that it reads from the new data store 406 in the manner specified above.

In a fourth approach, the application 122 includes code that links to the application-specific configuration tool 408. The computing device 402 can replace the application-specific configuration tool 408 with the global configuration tool 404, such that application's code now points to the global configuration tool 404. Or the computing device 402 can redirect the link that points to the application-specific configuration tool 408, such that, instead, it points to the global configuration tool 404. The redirection can be performed in different ways, such as using a shim component that redirects a call to the application-specific configuration tool 408 to the global configuration tool 404. The application-specific logic 126 and/or the canvas presentation component 128 can be configured such that it reads from the new data store 406 in the manner specified above.

In a fifth approach, the native the application 122 accommodates both the application-specific configuration tool 408 and the global configuration tool 404. The end user will use the global configuration tool 404 to make a first subset of configuration selections, and use the application-specific configuration tool 408 to make a second subset of configuration selections. The application-specific logic 126 and/or the canvas presentation component 128 can be configured such that it reads from both the old data store 410 and the new data store 406 on an as-needed basis.

Still other approaches can be used to account for the inclusion of the native application-specific configuration tool 408; the above-identified strategies are cited by way of example, not limitation.

B. Illustrative Processes

Figure 7:
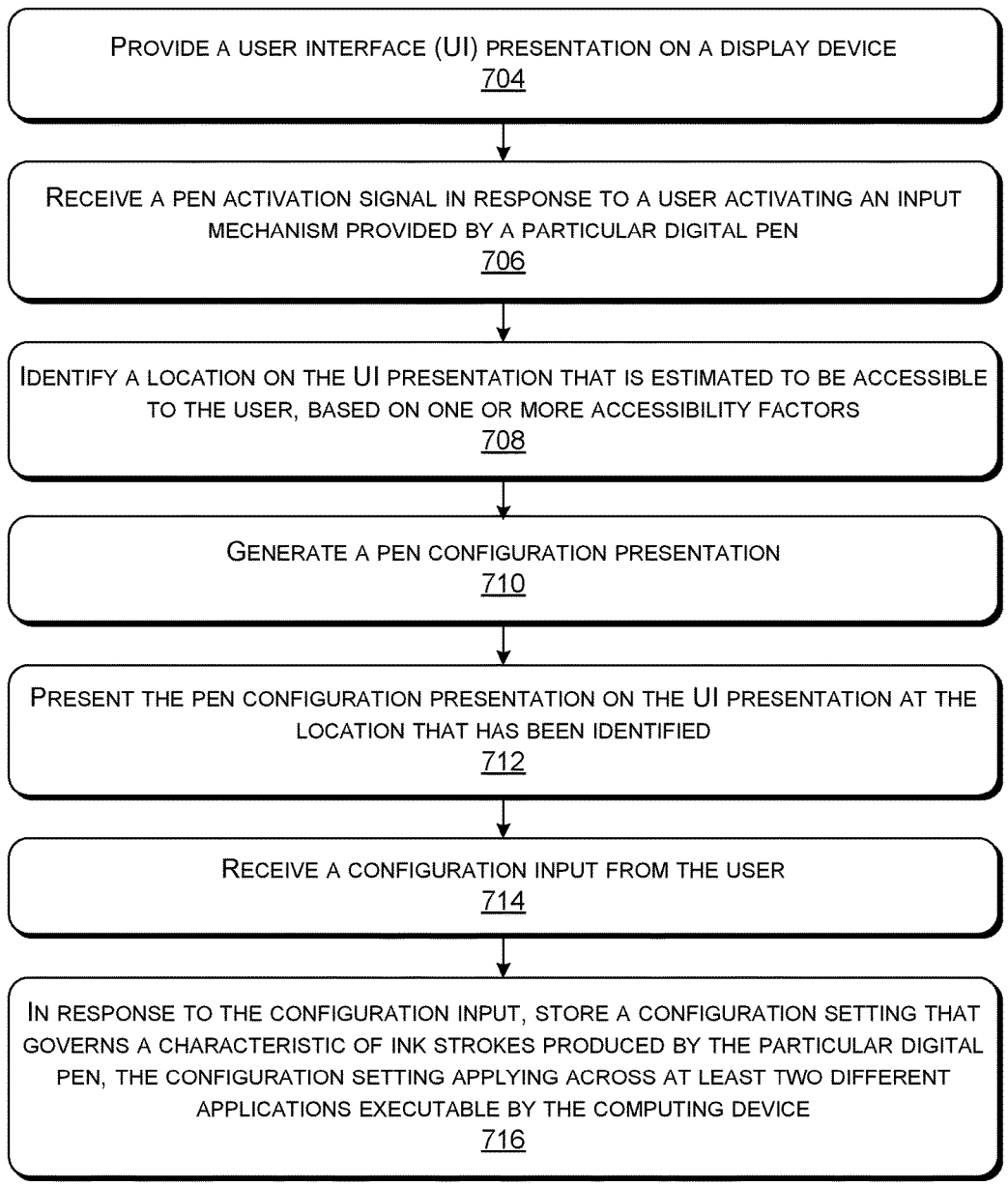
FIG. 7 shows a process that represents one manner of creating a configuration setting using the computing device of FIG. 1 or FIG. 4.
Figure 8:
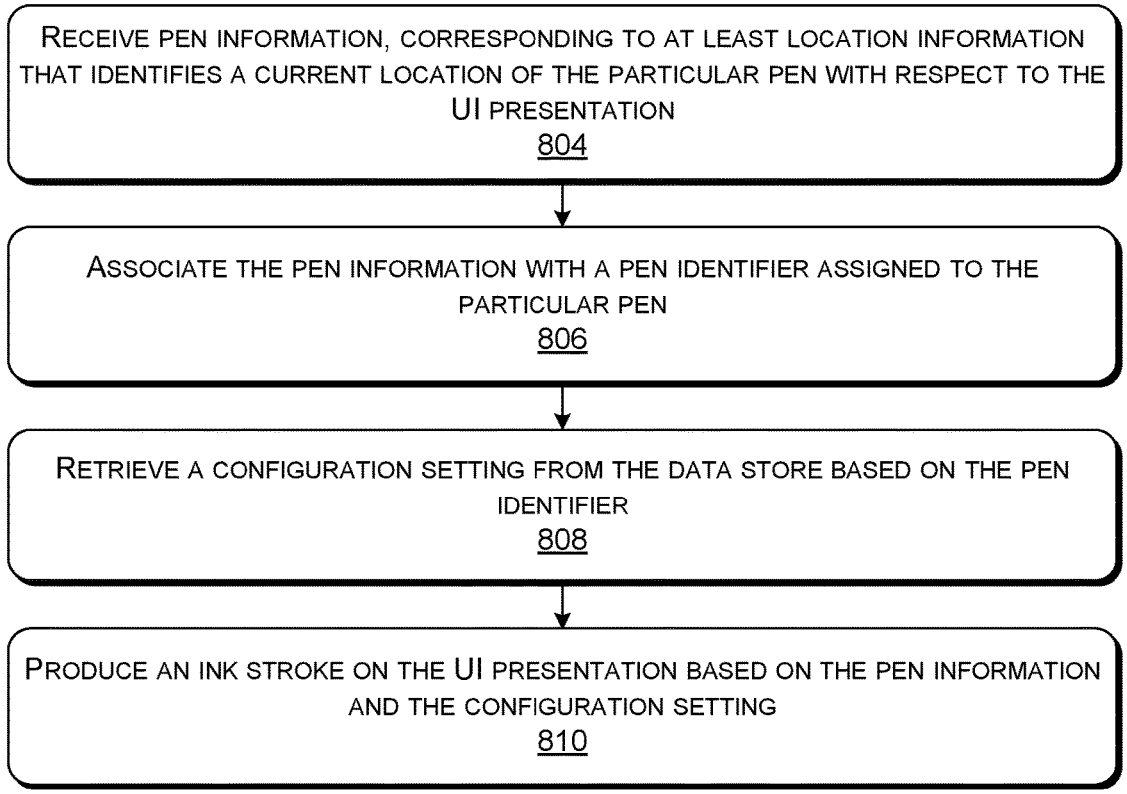
FIG. 8 shows a process that represents one manner of applying a configuration setting using the computing device of FIG. 1 or FIG. 4.

FIGS. 7 and 8 show processes (702, 802) that explain one manner of operation of the computing device 102 of FIG. 1 or the computing device 402 of FIG. 4 in flowchart form. For brevity, however, the description of the processes (702, 802) below will make reference to just the computing device 102 of FIG. 1.

Since the principles underlying the operation of the computing device 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 7 shows a process 702 that represents one manner of creating a configuration setting using the computing device 102. In block 704, the computing device 102 provides a user interface (UI) presentation on a display device 110. In block 706, the computing device 102 receives a pen activation signal in response to a user activating an input mechanism (e.g., 114, 116) provided by a particular digital pen 104. In block 708, the computing device 102 identifies a location on a UI presentation 108 that is estimated to be accessible to the user, based on one or more accessibility factors. In block 710, the computing device 102 generates a pen configuration presentation 118 in response to receiving the pen activation signal. In block 712, the computing device 102 presents the pen configuration presentation 118 on the UI presentation 108 at the location that has been identified (in block 708). In block 714, the computing device 102 receives a configuration input from the user in response to the user's interaction with the pen configuration presentation 118. In block 716, in response to the configuration input, the computing device 102 stores a configuration setting in the data store 134 that governs a characteristic (such as color) of ink strokes produced by the particular digital pen 104; that configuration setting applies across at least two different applications executable by the computing device 102.

FIG. 8 shows a process 802 that represents one manner of applying a configuration setting using the computing device 102. In block 804, the computing device 102 receives pen information, corresponding to at least location information that identifies a current location of a particular pen 104 with respect to the UI presentation 108. The pen information may also convey pressure information. In block 806, the computing device 102 associates the pen information with a pen identifier assigned to the particular pen 104. In block 808, the computing device retrieves the configuration setting from the data store 134 based on the pen identifier. In the examples described above, block 806 can be performed by the pen input processing component 124 and/or the application-specific logic 126 and/or the canvas presentation component 128. In block 810, the computing device 102 produces an ink stroke on the UI presentation 108 based on the pen information and the configuration setting.

C. Representative Computing Functionality

Figure 9:
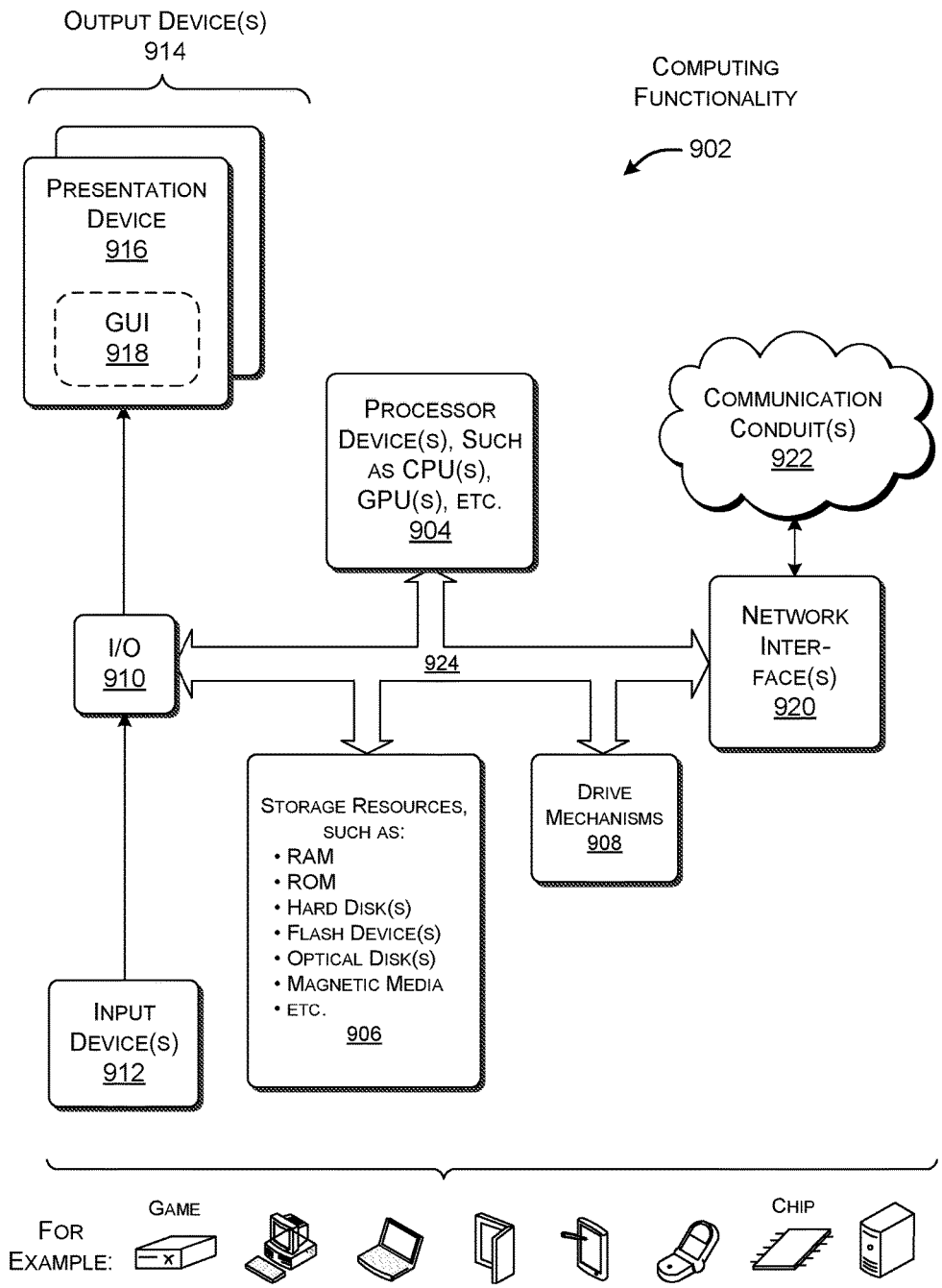
FIG. 9 shows illustrative computing functionality that can be used to implement any aspect of the features shown in the foregoing drawings.

FIG. 9 shows computing functionality 902 that can be used to implement any aspect of the mechanisms set forth in the above-described figures. For instance, the type of computing functionality 902 shown in FIG. 9 can be used to implement the computing device 102 of FIG. 1 or the computing device 104 of FIG. 4. In all cases, the computing functionality 902 represents one or more physical and tangible processing mechanisms.

The computing functionality 902 can include one or more hardware processor devices 904, such as one or more central processing units (CPUs), and/or one or more graphics processing units (GPUs), and so on. The computing functionality 902 can also include any storage resources (also referred to as computer-readable storage media or computer-readable storage medium devices) 906 for storing any kind of information, such as machine-readable instructions, settings, data, etc. Without limitation, for instance, the storage resources 906 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 902. The computing functionality 902 may perform any of the functions described above when the hardware processor device(s) 904 carry out computer-readable instructions stored in any storage resource or combination of storage resources. For instance, the computing functionality 902 may carry out computer-readable instructions to perform each block of the process 702 of FIG. 7 and each block of the process 802 of FIG. 8. The computing functionality 902 also includes one or more drive mechanisms 908 for interacting with any storage resource, such as a hard disk drive mechanism, an optical disk drive mechanism, and so on.

The computing functionality 902 also includes an input/output component 910 for receiving various inputs (via input devices 912), and for providing various outputs (via output devices 914). Illustrative input devices include at least a digital pen in conjunction with a digitizer, as described above. One particular output mechanism may include a display device 916 and an associated graphical user interface presentation (GUI) 918, corresponding to the display device 120 shown in FIG. 2. The display device 916 may correspond to a liquid crystal display device, a cathode ray tube device, a projection mechanism, etc. Other output devices include a printer, one or more speakers, a haptic output mechanism, an archival mechanism (for storing output information), and so on. The computing functionality 902 can also include one or more network interfaces 920 for exchanging data with other devices via one or more communication conduits 922. One or more communication buses 924 communicatively couple the above-described components together.

The communication conduit(s) 922 can be implemented in any manner, e.g., by a local area computer network, a wide area computer network (e.g., the Internet), point-to-point connections, etc., or any combination thereof. The communication conduit(s) 922 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 902 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method is described, performed by a computing device, for configuring a digital pen. The method includes: providing a user interface (UI) presentation on a display device; receiving a pen activation signal in response to a user activating an input mechanism provided by a particular digital pen; identifying a location on the UI presentation that is estimated to be accessible to the user, based on one or more accessibility factors; generating a pen configuration presentation; presenting the pen configuration presentation on the UI presentation at the location that has been identified; receiving a configuration input from the user in response to interaction by the user with the pen configuration presentation; and, in response to the configuration input, storing a configuration setting in a data store that governs a characteristic of ink strokes produced by the particular digital pen. The configuration setting applies across at least two different applications executable by the computing device, and is paired in the data store with a pen identifier associated with the particular pen.

According to a second aspect, the pen activation signal is received in response to the user activating a button provided by the particular digital pen.

According to a third aspect, one accessibility factor describes a last location at which the user has applied an ink stroke on the UI presentation.

According to a fourth aspect, one accessibility factor describes a current location of a hand of the user and/or the particular digital pen relative to the display device.

According to a fifth aspect, one accessibility factor describes a representative location defined with respect to plural ink strokes produced by the user on the UI presentation within a recent span of time that culminates in a current time.

According to a sixth aspect, the configuration setting specifies a color of the ink strokes produced by the particular digital pen.

According to a seventh aspect, the configuration setting specifies a baseline line thickness of the ink strokes produced by the particular digital pen.

According to an eighth aspect, the configuration setting applies to at least a class of applications executed by the computing device.

According to a ninth aspect, the method further includes repeating the above-described operations for another digital pen, to provide another configuration setting for the other digital pen that applies across at least two different applications executable by the computing device. The other configuration setting is paired in the data store with another pen identifier, corresponding to the other pen to which it pertains.

According to a tenth aspect, the pen configuration presentation includes a prompt that invites the user to specify an application-related scope of the configuration setting.

According to an eleventh aspect, the prompt (referenced in the tenth aspect) invites the user to specify whether the configuration setting applies to a particular application that is executable by the computing device, or plural applications that are executable by the computing device.

According to a twelfth aspect, the method (according to the eleventh aspect) further includes: receiving additional configuration input from the user; and in response to the additional configuration input, storing an additional configuration setting that governs a characteristic of ink strokes produced by the particular digital pen. The additional configuration setting applies to only a single particular application executable by the computing device.

According to a thirteenth aspect, the input mechanism is a member of a set of plural input mechanisms provided by the particular pen. Further, activation of at least some input mechanisms provides instructions to load different respective configuration settings for the particular pen.

According to a fourteenth aspect, the input mechanism is a member of a set of plural input mechanisms provided by the particular pen. Further, activation of at least some input mechanisms produces different pen configuration presentations that allow the user to perform different respective configuration operations.

According to a fifteenth aspect, the pen configuration presentation includes a prompt that invites the user to specify an identifier associated with the particular pen.

According to a sixteenth aspect, the method further includes processing pen information provided by the particular pen following storage of the configuration setting, including: receiving pen information, corresponding to at least location information that identifies a current location of the particular pen with respect to the UI presentation; associating the pen information with the pen identifier assigned to the particular pen; retrieving the configuration setting from the data store based on the pen identifier; and producing an ink stroke on the UI presentation based on the pen information and the configuration setting.

According to a seventeenth aspect, a computing is described for configuring a digital pen. The computing device includes a tool activation component configured to receive a pen activation signal in response to a user activating an input mechanism provided by a particular digital pen. The computing device also includes a location determination component configured to identify a location on a user interface (UI) presentation that is estimated to be accessible to the user, based on one or more accessibility factors, the UI presentation being generated by the computing device. The computing device further includes a configuration tool configured to: generate a pen configuration presentation in response to the pen activation signal; present the pen configuration presentation on the UI presentation at the location that has been identified; receive a configuration input from the user in response to interaction by the user with the pen configuration presentation; and in response to the configuration input, store a global configuration setting in a data store that governs a characteristic of ink strokes produced by the particular digital pen. The global configuration setting applies across plural applications executable by the computing device, and is paired in the data store with a pen identifier associated with the particular pen.

According to an eighteenth aspect, the pen configuration presentation (of the seventeenth aspect) includes a prompt that invites the user to specify whether the configuration setting applies to a particular application that is executable by the computing device, or plural applications that are executable by the computing device.

According to a nineteenth aspect, the input mechanism is a member of a set of plural input mechanisms provided by the particular pen. Further, activation of at least some input mechanisms provides instructions to load different respective configuration settings for the particular pen.

According to a twentieth aspect, a computer-readable storage medium for storing computer-readable instructions is described. The computer-readable instructions, when executed by one or more processor devices, perform a method that includes: providing a user interface (UI) presentation on a display device; receiving a pen activation signal in response to a user activating an input mechanism provided by a particular digital pen; and generating a pen configuration presentation in response to receiving the pen activation signal. The pen configuration presentation includes: a prompt that invites the user to specify an application-related scope of the configuration setting, selectable scopes corresponding to an application-specific scope that applies to just a particular application, and a global scope that applies to plural applications; and a prompt that invites the user to specify at least one characteristic of ink strokes produced by the particular digital pen. The method also includes: presenting the pen configuration presentation on the UI presentation at a specified location; receiving a configuration input from the user in response to interaction by the user with the pen configuration presentation; and, in response to the configuration input, storing a configuration setting in a data store that governs a characteristic of ink strokes produced by the particular digital pen, the configuration setting being paired in the data store with a pen identifier associated with the particular pen. In a subsequent drawing operation, the method further includes: receiving pen information, corresponding to at least location information that identifies a current location of the particular pen with respect to the UI presentation; associating the pen information with the pen identifier assigned to the particular pen; retrieving the configuration setting from the data store based on the pen identifier; and producing an ink stroke on the UI presentation based on the pen information and the configuration setting.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by a computing device, comprising:
   providing a user interface (UI) presentation on a display device;
   receiving a pen activation signal in response to a user activating an input mechanism provided by a particular digital pen;
   identifying a location on the UI presentation that is estimated to be accessible to the user, based on one or more accessibility factors;
   generating a pen configuration presentation;
   presenting the pen configuration presentation on the UI presentation at the location that has been identified;
   receiving a configuration input from the user in response to interaction by the user with the pen configuration presentation; and
   in response to the configuration input, storing a configuration setting in a data store that governs a characteristic of ink strokes produced by the particular digital pen,
   the configuration setting applying across at least two different applications executable by the computing device, and being paired in the data store with a pen identifier associated with the particular digital pen.

2. The method of claim 1, wherein the pen activation signal is received in response to the user activating a button provided by the particular digital pen.

3. The method of claim 1, wherein one accessibility factor describes a last location at which the user has applied an ink stroke on the UI presentation.

4. The method of claim 1, wherein one accessibility factor describes a current location of a hand of the user and/or the particular digital pen relative to the display device.

5. The method of claim 1, wherein one accessibility factor describes a representative location defined with respect to plural ink strokes produced by the user on the UI presentation within a recent span of time that culminates in a current time.

6. The method of claim 1, wherein the configuration setting specifies a color of the ink strokes produced by the particular digital pen.

7. The method of claim 1, wherein the configuration setting specifies a baseline line thickness of the ink strokes produced by the particular digital pen.

8. The method of claim 1, wherein the configuration setting applies to at least a class of applications executed by the computing device.

9. The method of claim 1,
further comprising repeating the method for another digital pen, to provide another configuration setting for the another digital pen that applies across at least two different applications executable by the computing device,
wherein the another configuration setting is paired in the data store with another pen identifier, corresponding to the another digital pen to which it pertains.

10. The method of claim 1, wherein the pen configuration presentation includes a prompt that invites the user to specify an application-related scope of the configuration setting.

11. The method of claim 10, wherein the prompt invites the user to specify whether the configuration setting applies to a particular application that is executable by the computing device, or plural applications that are executable by the computing device.

12. The method of claim 1, further comprising:
receiving additional configuration input from the user; and
in response to the additional configuration input, storing an additional configuration setting that governs a characteristic of ink strokes produced by the particular digital pen,
the additional configuration setting applying to only a single particular application executable by the computing device.

13. The method of claim 1,
wherein the input mechanism is a member of a set of plural input mechanisms provided by the particular digital pen, and
wherein activation of at least some input mechanisms provides instructions to load different respective configuration settings for the particular digital pen.

14. The method of claim 1,
wherein the input mechanism is a member of a set of plural input mechanisms provided by the particular digital pen, and
wherein activation of at least some input mechanisms produces different pen configuration presentations that allow the user to perform different respective configuration operations.

15. The method of claim 1, wherein the pen configuration presentation includes a prompt that invites the user to specify an identifier associated with the particular digital pen.

16. The method of claim 1, further comprising processing pen information provided by the particular digital pen following storage of the configuration setting, including:
receiving pen information, corresponding to at least location information that identifies a current location of the particular digital pen with respect to the UI presentation;
associating the pen information with the pen identifier assigned to the particular digital pen;
retrieving the configuration setting from the data store based on the pen identifier; and
producing an ink stroke on the UI presentation based on the pen information and the configuration setting.

17. A computing device for configuring a digital pen, comprising:
a tool activation component configured to receive a pen activation signal in response to a user activating an input mechanism provided by a particular digital pen;
a location determination component configured to identify a location on a user interface (UI) presentation that is estimated to be accessible to the user, based on one or more accessibility factors, the UI presentation being generated by the computing device;
a configuration tool configured to:
generate a pen configuration presentation in response to the pen activation signal;
present the pen configuration presentation on the UI presentation at the location that has been identified;
receive a configuration input from the user in response to interaction by the user with the pen configuration presentation; and
in response to the configuration input, store a global configuration setting in a data store that governs a characteristic of ink strokes produced by the particular digital pen,
the global configuration setting applying across plural applications executable by the computing device, and being paired in the data store with a pen identifier associated with the particular digital pen.

18. The computing device of claim 17, wherein the pen configuration presentation includes a prompt that invites the user to specify whether the global configuration setting applies to a particular application that is executable by the computing device, or plural applications that are executable by the computing device.

19. The computing device of claim 17,
wherein the input mechanism is a member of a set of plural input mechanisms provided by the particular digital pen, and
wherein activation of at least some input mechanisms provides instructions to load different respective configuration settings for the particular digital pen.

20. A computer-readable storage medium for storing computer-readable instructions, the computer-readable instructions, when executed by one or more processor devices, performing a method that comprises:
providing a user interface (UI) presentation on a display device;
receiving a pen activation signal in response to a user activating an input mechanism provided by a particular digital pen;
generating a pen configuration presentation in response to receiving the pen activation signal, wherein the pen configuration presentation includes:
a prompt that invites the user to specify an application-related scope of a configuration setting, selectable scopes corresponding to an application-specific scope that applies to just a particular application, and a global scope that applies to plural applications; and
a prompt that invites the user to specify at least one characteristic of ink strokes produced by the particular digital pen;

presenting the pen configuration presentation on the UI presentation at a specified location based on one or more accessibility factors;

receiving a configuration input from the user in response to interaction by the user with the pen configuration presentation;

in response to the configuration input, storing a configuration setting in a data store that governs a characteristic of ink strokes produced by the particular digital pen, the configuration setting being paired in the data store with a pen identifier associated with the particular digital pen; and in a drawing operation:

receiving pen information, corresponding to at least location information that identifies a current location of the particular digital pen with respect to the UI presentation;

associating the pen information with the pen identifier assigned to the particular pen;

retrieving the configuration setting from the data store based on the pen identifier; and producing an ink stroke on the UI presentation based on the pen information and the configuration setting.

21. A computing device, comprising:

storage storing computer-readable instructions;

a processor configured to execute the computer-readable instructions to:

obtain a user defined pen configuration setting for an input mechanism of a particular digital pen, the pen configuration setting being defined by the user to be applied globally to all applications of the computing device or to a set of specific applications;

receive a pen activation signal from the input mechanism of the particular digital pen; and, interpret the pen activation signal with the pen configuration setting.

22. The computing device of claim 21, further comprising an operating system operating on the computing device and wherein the operating system comprises the computer-readable instructions that are executed by the processor.

* * * * *